United States Patent
Iizuka et al.

(10) Patent No.: US 12,522,295 B2
(45) Date of Patent: Jan. 13, 2026

(54) STEERING ASSISTANCE DEVICE FOR SADDLE TYPE VEHICLE

(71) Applicant: HONDA MOTOR CO., LTD., Tokyo (JP)

(72) Inventors: Chikashi Iizuka, Tokyo (JP); Yosuke Wada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 291 days.

(21) Appl. No.: 17/764,575

(22) PCT Filed: Sep. 28, 2020

(86) PCT No.: PCT/JP2020/036584
§ 371 (c)(1),
(2) Date: Mar. 29, 2022

(87) PCT Pub. No.: WO2021/065780
PCT Pub. Date: Apr. 8, 2021

(65) Prior Publication Data
US 2022/0340203 A1     Oct. 27, 2022

(30) Foreign Application Priority Data
Sep. 30, 2019   (JP) ................. 2019-179031

(51) Int. Cl.
*B62D 15/02*    (2006.01)
*B62D 5/04*    (2006.01)

(52) U.S. Cl.
CPC ....... *B62D 15/0265* (2013.01); *B62D 5/0409* (2013.01); *B62D 5/046* (2013.01)

(58) Field of Classification Search
CPC .. B62D 15/0265; B62D 5/0409; B62D 5/046; B62J 45/40; B62J 50/21; B62J 27/00; B62K 21/00
See application file for complete search history.

(56) References Cited

U.S. PATENT DOCUMENTS

| | | | |
|---|---|---|---|
| 2009/0139793 A1 | 6/2009 | Suzuki | |
| 2013/0194127 A1* | 8/2013 | Ishihara | H01Q 1/3283 342/70 |

(Continued)

FOREIGN PATENT DOCUMENTS

| | | |
|---|---|---|
| DE | 102015226847 | 7/2017 |
| EP | 3335953 | 6/2018 |

(Continued)

OTHER PUBLICATIONS

English translation of Yamamoto (JP 2006347508) (Year: 2006).*

(Continued)

*Primary Examiner* — Kyle J Kingsland
(74) *Attorney, Agent, or Firm* — Amin, Turocy & Watson, LLP

(57) ABSTRACT

When an external detection device detects an obstacle (another vehicle (T)) on either a left or right side of the own vehicle (M), a control device of a steering assistance device for a saddle type vehicle controls an assist torque so that a handle operation to the side opposite to the side on which the obstacle is detected becomes heavier (more difficult to turn) than a case in which the obstacle is not detected. The handle operation to the side on which the obstacle is detected makes a handle relatively light (makes it easier to turn) while steering assist is maintained.

2 Claims, 9 Drawing Sheets

(56) References Cited

U.S. PATENT DOCUMENTS

| | | |
|---|---|---|
| 2017/0192433 A1 | 7/2017 | Kuttenberger |
| 2019/0077396 A1 | 3/2019 | Kuttenberger |
| 2020/0013113 A1 | 1/2020 | Tezuka et al. |
| 2020/0171946 A1 | 6/2020 | Matsuda |

FOREIGN PATENT DOCUMENTS

| | | | |
|---|---|---|---|
| GB | 2570521 A * | 7/2019 | ............... B62D 9/02 |
| JP | 2004-220422 | 8/2004 | |
| JP | 2005-062912 | 3/2005 | |
| JP | 2006-347508 | 12/2006 | |
| JP | 2008-055985 | 3/2008 | |
| JP | 2010-012903 | 1/2010 | |
| JP | 2012-076490 | 4/2012 | |
| JP | 2014-232508 | 12/2014 | |
| JP | 2016-068769 | 5/2016 | |
| JP | 2017-047799 | 3/2017 | |
| JP | 2017-206169 | 11/2017 | |
| JP | 2019-501053 | 1/2019 | |
| WO | 2016/021607 | 2/2016 | |
| WO | 2017/030130 | 2/2017 | |
| WO | 2018/179399 | 10/2018 | |
| WO | 2018/216308 | 11/2018 | |

OTHER PUBLICATIONS

English translation of Harumoto (JP 2005062912) (Year: 2005).*
"Owner's Manual 2019 CR-V", Honda Motor Co. (Year: 2019).*
German Office Action for German Patent Application No. 112020004697.4 mailed Apr. 3, 2023.
Chinese Office Action for Chinese Patent Application No. 202080067381.9 dated Mar. 15, 2023.
International Search Report and Written Opinion for International Application No. PCT/JP2020/036584 mailed on Dec. 8, 2020, 8 pages.
Chinese Office Action for Chinese Patent Application No. 202080067381.9 mailed Sep. 15, 2023.

* cited by examiner

FIG. 6

| SYSTEM EXAMPLE | WARNING EXAMPLE 1 | WARNING EXAMPLE 2 | WARNING EXAMPLE 3 | HIGH-STABILITY CONTROL |
|---|---|---|---|---|
| CMBS | WARNING DISPLAY (TTC=t1) | WARNING 1 + WEAK BRAKING (TTC=t2) | WARNING 2 + FORCED BRAKING (TTC=t3) | WARNING 3 STATE FLAG ON |
| LDW | WARNING DISPLAY (TTLD=t1) | WARNING 1 (TTLD=t2) | WARNING 2 (TTLD=t3) | WARNING 3 STATE FLAG ON |
| BSI | — — | WARNING DISPLAY (VEHICLE PRESENCE SIGNAL) | WARNING 2 (VEHICLE PRESENCE SIGNAL + BLINKER WITH VEHICLE) | WARNING 3 STATE FLAG ON |

STEERING ASSISTANCE DEVICE FOR SADDLE TYPE VEHICLE

TECHNICAL FIELD

The present invention relates to a steering assistance device for a saddle type vehicle.

BACKGROUND ART

Patent Document 1 (Japanese Unexamined Patent Application, First Publication No. 2008-55985) discloses that, in a control device that assists with parking of a passenger car, a direction or magnitude of a steering torque generated by a steering actuator is different when a direction of a steering operation by a driver is the same as an avoidance direction for avoiding contact with an obstacle and when the direction of the steering operation is a direction opposite to the avoidance direction.

Thus, the steering operation can be allowed according to a driver's intention without being disturbed by the steering torque generated by the actuator, while the steering torque generated by the steering actuator assists in avoiding the contact with an obstacle.

SUMMARY OF INVENTION

Technical Problem

However, in the above-described related art, there is no disclosure about appropriate assist steering when an advanced rider assistance system of a saddle type vehicle is operated. For example, there is a demand for appropriate control during an operation of a system such as a collision mitigation brake, a lane departure warning, and blind spot information.

An aspect of the present invention is to achieve appropriate assist steering control when an advanced rider assistance system is operated in a steering assistance device for a saddle type vehicle in which a vehicle body is rolled to generate a steering angle at a steering wheel.

Solution to Problem (1) A steering assistance device for a saddle riding vehicle according to an aspect of the present invention is a steering assistance device for a saddle riding vehicle that rocks a vehicle body in a roll direction and generates a steering angle on a steering wheel, including a steering actuator configured to apply an assist torque to a suspension device that supports the steering wheel, a control device configured to drive and control the steering actuator, and an external detection device configured to detect a situation around the vehicle, wherein, when the external detection device detects an obstacle on either a left or right side of an own vehicle, the control device controls the assist torque so that a handle operation to a side opposite to a side on which the obstacle is detected becomes heavier than a case in which the obstacle is not detected.

(2) In the aspect of (1), the control device may control the assist torque so that a handle operation to the side opposite to the side on which the obstacle is detected becomes heavy when the control device detects an obstacle on either the left or right side of the own vehicle and also detects a course change prediction operation of the own vehicle to the side on which the obstacle is detected.

(3) In the aspect of (1) or (2), when the control device detects that another vehicle located behind the own vehicle in the same lane as the own vehicle has either a left or right blinker on, the control device may predict and detect the presence of an obstacle on a side on which the blinker is on.

Advantageous Effects of Invention

According to the aspect (1), while an advanced rider assistance system detects an obstacle on the left or right side of the own vehicle, the handle operation to the side opposite to the side on which the obstacle is detected becomes heavy based on this obstacle detection information. In the saddle type vehicle that rolls the vehicle body to generate a steering angle, the handle operation to the side opposite to the side on which the obstacle is detected is a reverse handle operation which is a starting point of changing the course to the side on which the obstacle is detected. The change of course to the side on which the obstacle is detected can be suppressed by suppressing this reverse handle operation. In this way, it is possible to perform the appropriate assist steering control according to a situation around the vehicle, and it is possible to enhance the effect of the advanced rider assistance system.

According to the aspect (2), it is possible to generate the assist torque as usual until the course change prediction operation of the own vehicle M to the side on which the obstacle is detected is detected. As a result, it is possible to perform the assist steering control with less discomfort to the driver.

According to the aspect (3), the appropriate assist steering control can be performed not only when the presence of the other vehicle is actually detected on either the left or right side behind the own vehicle, but also when the presence of the other vehicle is predicted.

BRIEF DESCRIPTION OF DRAWINGS

FIG. 6 is a table showing warning examples for each function in an advanced rider assistance system of the motorcycle and a trigger plan when shifting to high-stability control.

DESCRIPTION OF EMBODIMENTS

Figure 1:
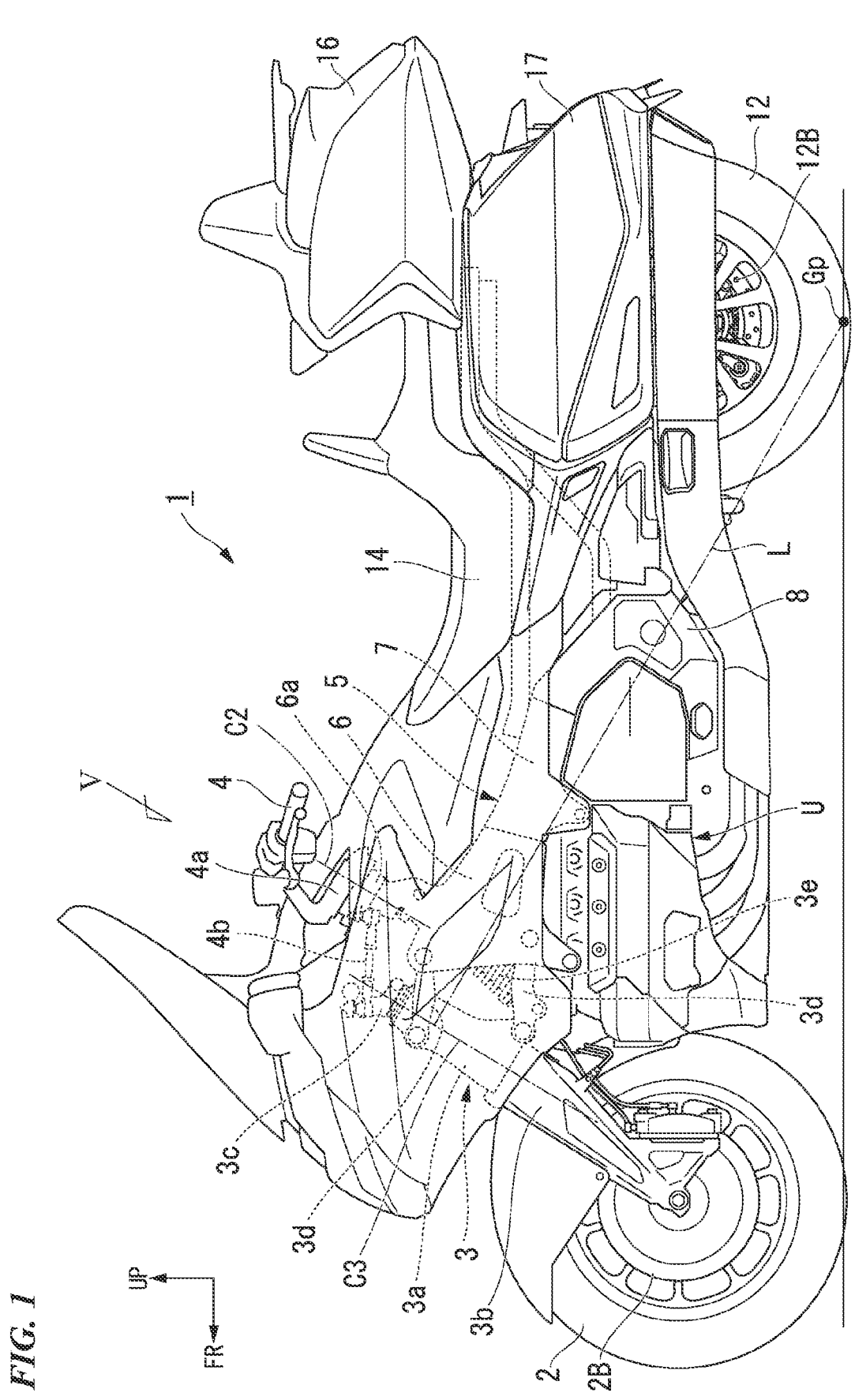
FIG. 1 is a left side view of a motorcycle according to an embodiment of the present invention.

Hereinafter, an embodiment of the present invention will be described with reference to the drawings. Unless otherwise specified, directions such as forward, rearward, leftward, and rightward in the following description are the same as the directions in a vehicle described below. In appropriate locations in the drawings used in the following description, an arrow FR indicating a forward direction with respect to the vehicle, an arrow LH indicating a left direction with respect to the vehicle, an arrow UP indicating an upward direction with respect to the vehicle, and a line CL indicating a center of a vehicle body in a left-right direction are shown.

<Whole Vehicle>

As shown in FIG. 1, the present embodiment is applied to a motorcycle (a saddle type vehicle) 1 provided with a large cowling. A front wheel 2 of the motorcycle 1 is supported by a front wheel suspension device 3. The front wheel suspension device 3 is supported by a front end portion of a vehicle body frame 5. A front block 6 that supports the front wheel suspension device 3 is provided at the front end portion of the vehicle body frame 5. A bar handle 4 for steering the front wheel is mounted on an upper portion of the front block 6. The bar handle 4 has a pair of left and right grips for a rider (a driver) J to grip.

A pair of left and right main frames 7 extend diagonally downward and rearward behind the front block 6. Rear end portions of the left and right main frames 7 are connected to upper end portions of a pair of left and right pivot frames 8, respectively. A power unit U including, for example, a horizontally opposed six-cylinder engine is mounted below the left and right main frames 7 and in front of the left and right pivot frames 8.

A front end portion of a swing arm 11 is supported by the left and right pivot frames 8. A rear wheel 12 of the motorcycle 1 is supported at a rear end portion of the swing arm 11. A rear cushion (not shown) is interposed between a front portion of the swing arm 11 and an intermediate portion of the vehicle body frame 5 in a forward-rearward direction.

A front end portion of a rear frame 9 is connected to the rear portion of the left and right pivot frames 8. A seat 14 for an occupant to sit on is disposed above the rear frame 9. A fuel tank 15 is disposed below the seat 14. A rear trunk 16 is disposed behind the seat 14. Left and right saddle bags 17 are disposed on both left and right sides below the rear trunk 16, respectively.

The motorcycle 1 includes a front wheel brake 2B for braking the front wheel 2 and a rear wheel brake 12B for braking the rear wheel 12. Each of the front and rear brakes 2B and 12B is a hydraulic disc brake. The motorcycle 1 includes a brake actuator 42 (refer to FIG. 5) that supplies and discharges hydraulic pressure to/from the front and rear brakes 2B and 12B. In the motorcycle 1, a by-wire type brake system in which the front and rear brakes 2B and 12B and brake operators such as a brake lever and a brake pedal operated by the rider J are electrically linked is constituted.

<Front Wheel Suspension Device>

The front wheel suspension device 3 includes a handle support unit 6a provided at an upper end portion of the front block 6, a handle post 4a rotatably supported by the handle support unit 6a, a head pipe 3a provided separately from the vehicle body frame 5, a front fork member 3b rotatably supported by the head pipe 3a, a turning member 3c integrally rotatably mounted on an upper end portion of the front fork member 3b, a link member 4b that connects the turning member 3c to the handle post 4a, a rocking arm 3d that rockably connects the head pipe 3a to the front block 6, and a cushion unit 3e interposed between the front fork member 3b and the front block 6.

The front fork member 3b supports the front wheel 2 at lower end portions of the left and right forks. A steering shaft is integrally provided at an upper end portion of the front fork member 3b, and the steering shaft is inserted through and supported by the head pipe 3a. An upper end portion of the steering shaft protrudes above the head pipe 3a, and the turning member 3c is mounted on the upper end portion.

Hereinafter, a rotation center axis of the handle post 4a with respect to the handle support unit 6a will be referred to as a handle rotation axis C2. A rotation center axis of the front fork member 3b with respect to the head pipe 3a will be referred to as a steering axis C3. The steering axis C3 is offset (separated) forward from the handle rotation axis C2. The steering axis C3 and the handle rotation axis C2 are substantially parallel to each other in a 1G state of the vehicle.

Figure 5:
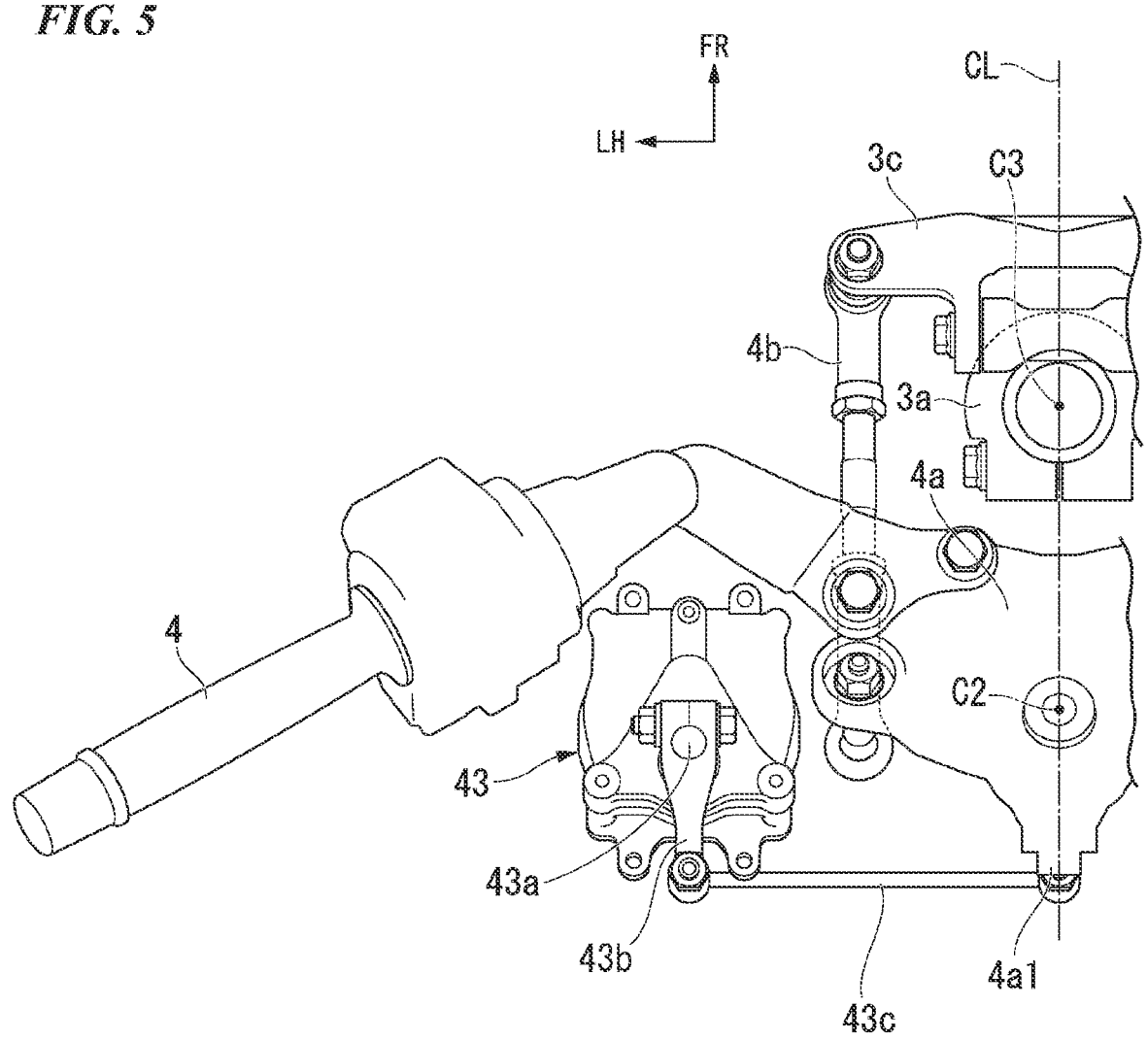
FIG. 5 is a view of an arrow V of FIG. 1.

FIG. 5 is a view in a direction of an arrow V along the steering axis C3 and the handle rotation axis C2 in FIG. 1. In FIG. 5, the link member 4b forms a parallel link together with the turning member 3c and the handle post 4a. Thus, a steering angle of the bar handle 4 and a turning angle of the front wheel 2 become the same as each other.

With reference to FIG. 1, a front end portion of the rocking arm 3d is supported by the head pipe 3a to be rockable up and down, and a rear end portion thereof is supported by the front block 6 to be rockable up and down. The rocking arm 3d includes a pair of upper and lower arm members. The rocking arm 3d allows the head pipe 3a to move up and down in a predetermined trajectory. For example, a lower end portion of the cushion unit 3e is connected to the lower arm member.

The front wheel suspension device rocks the rocking arm 3d upward to move the front fork member 3b and the head pipe 3a upward. At this time, the lower arm member moves the lower end portion of the cushion unit 3e upward to compress the cushion unit 3e.

The front wheel suspension device rocks the rocking arm 3d downward to move the front fork member 3b and the head pipe 3a downward. At this time, the lower arm member moves the lower end portion of the cushion unit 3e downward to stretch the cushion unit 3e.

<Control Device>

Figure 2:
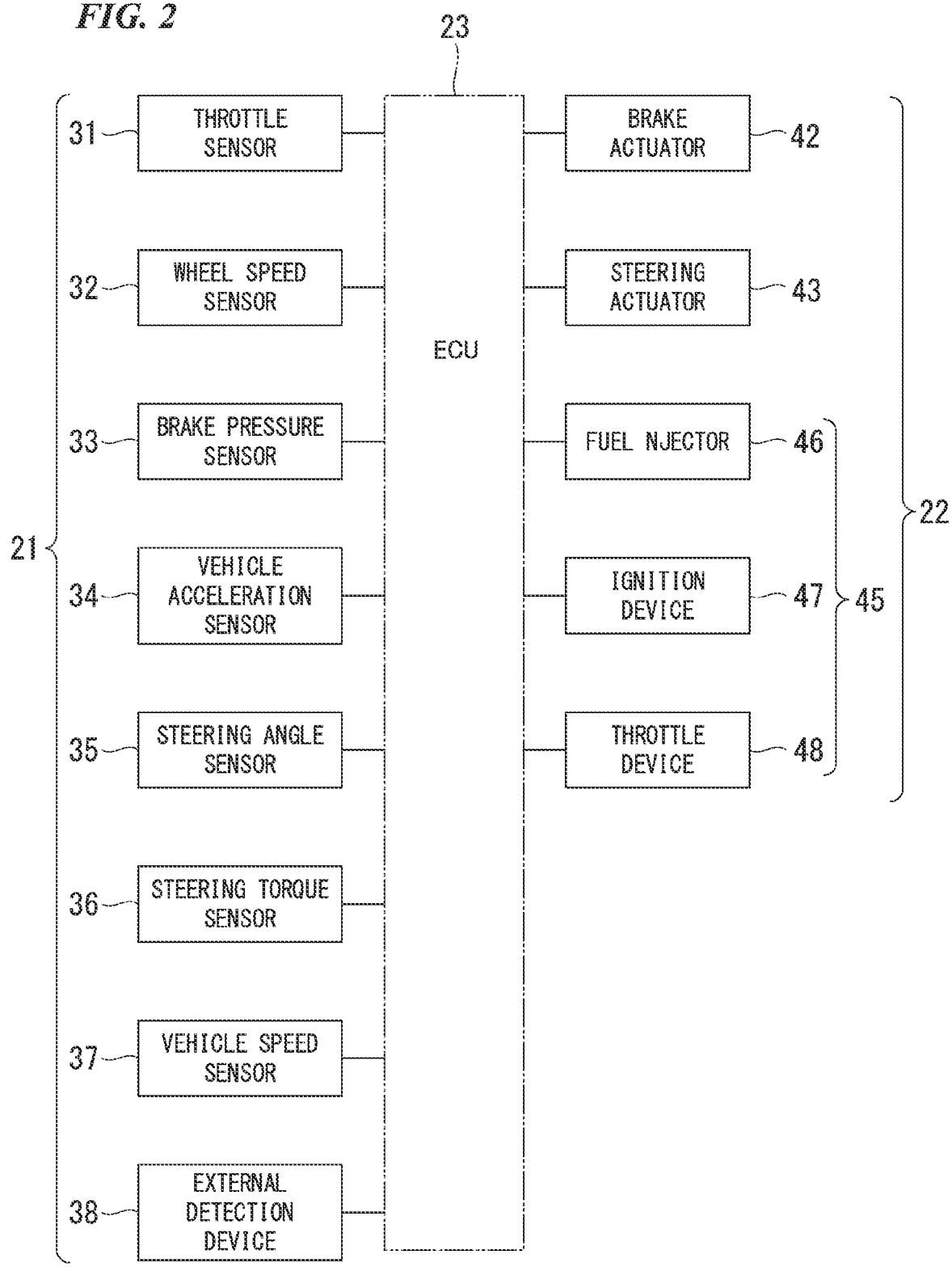
FIG. 2 is a constitution diagram of a control device for the motorcycle.

FIG. 2 is a constitution diagram of a control device 23 of the motorcycle 1 according to the present embodiment.

The motorcycle 1 includes the control device 23 that controls an operation of various devices 22 based on detection information acquired from various sensors 21. The control device 23 is configured as, for example, an integrated or a plurality of electronic control units (ECUs). At least part of the control device 23 may be realized by cooperation of software and hardware. The control device 23 includes a fuel injection control unit, an ignition control unit, and a throttle control unit that control an operation of the engine 10. In the motorcycle 1, a by-wire engine control system in which an engine auxiliary device such as a throttle device 48 and an accelerator controller such as an accelerator grip operated by the rider J are electrically linked is constituted.

The various sensors 21 include a throttle sensor 31, a wheel speed sensor 32, a brake pressure sensor 33, a vehicle acceleration sensor 34, a steering angle sensor 35, a steering torque sensor 36 and a vehicle speed sensor 37, and an external detection device 38.

The various sensors 21 detect various operation inputs of the rider J, various states of the motorcycle 1 and the occupant, and a situation around an own vehicle. The various sensors 21 output a variety of detection information to the control device 23.

The throttle sensor 31 detects an operation amount (an acceleration request) of an accelerator controller such as a throttle grip.

The brake pressure sensor 33 detects an operation force (a deceleration request) of the brake operator.

The vehicle acceleration sensor 34 is a 5-axis or 6-axis inertial measurement unit (IMU). The vehicle acceleration sensor 34 detects an angular rate and an acceleration in 3 axes (a roll axis, a pitch axis, and a yaw axis) in the vehicle body and further detects an angle from results thereof. Hereinafter, the vehicle acceleration sensor 34 may be referred to as a vehicle angular rate sensor 34.

The steering angle sensor 35 is, for example, a potentiometer provided on the steering shaft (a handle rotation shaft). The steering angle sensor 35 detects a rotation angle (a steering angle) of the steering shaft with respect to the vehicle body.

The steering torque sensor 36 is, for example, a magnetostrictive torque sensor provided on the steering shaft (or a rotation shaft of the handle post 4a) of the fork member 3b and detects a torsional torque (a steering input) input from the bar handle 4. The steering torque sensor 36 is an example of a load sensor that detects a steering force input to the bar handle 4 (a steering operator).

In the front wheel suspension device 3 of the embodiment, the rotation shaft of the handle post 4a that supports the bar handle 4 and the steering shaft that enables the front wheel 2 to be steered are separate from each other, but the present invention is not limited thereto. For example, the handle rotation shaft and the steering shaft (the front wheel rotation shaft) may be the same as each other, as in a general front wheel suspension device. The front wheel suspension device may be configured to be supported by the head pipe at the front end portion of the vehicle body frame 5.

The external detection device 38 includes, for example, a camera, a radar device, a finder, and an object recognition device.

The camera is, for example, a digital camera using a solid-state imaging device such as a charge coupled device (CCD) or a complementary metal oxide semiconductor (CMOS). The camera is mounted on any part of the motorcycle 1. When the front is captured, the camera is mounted on a vehicle body component (on the turning side and the non-turning side), various exterior components, and the like. For example, the camera periodically and repeatedly captures the periphery (for example, the front, the rear, the left and the right) of the motorcycle 1. An image captured by the camera is appropriately subjected to image processing, becomes desired image data and is used for a variety of control. Information from the camera is used for recognizing a position, a type, a speed, and the like of an object in a detection direction, and driving assist control, automatic driving control and the like of the motorcycle 1 are performed based on such recognition. For example, the camera may be a camera that captures not only visible light but also invisible light such as infrared light.

The radar device radiates radio waves such as millimeter waves around the motorcycle 1, detects the radio waves (reflected waves) reflected by an object and detects at least a position (a distance and a direction) of the object. The radar device is mounted on any part of the motorcycle 1. The radar device detects the position and speed of an object in front of, behind, and on the left and right sides of the motorcycle 1.

The finder is a light detection and ranging (LIDAR). The finder irradiates the periphery of the motorcycle 1 with light and measures scattered light. The finder detects a distance to a target based on a time from light emission to light reception. The emitted light is, for example, a pulsed laser beam. The finder can be mounted on any part of the motorcycle 1.

The object recognition device performs sensor fusion processing on detection results of some or all of the camera, the radar device, and the finder and recognizes the position, the type, the speed, and the like of the object. The object recognition device outputs the recognition results to the control device 23. The object recognition device may output the detection results of the camera, the radar device, and the finder to the control device 23 as they are. The object recognition device may be omitted.

An automatic driving system is adopted in the motorcycle 1.

Here, there are the following degrees in the automatic driving of the vehicle. A degree of automatic driving can be determined, for example, by a measure such as whether it is less than a predetermined standard or equal to or more than the predetermined standard.

The fact that degree of automatic driving is less than a predetermined standard is, for example, a case in which manual driving is being performed or a case in which only an advanced rider assistance system such as an adaptive cruise control system (ACC) and a lane keeping assist system (LKAS) is operating. A driving mode in which the degree of automatic driving is less than a predetermined standard is an example of a "first driving mode".

The fact that the degree of automatic driving is equal to or more than a predetermined standard is, for example, a case in which the advanced rider assistance system such as auto lane changing (ALC) or low speed car passing (LSP) which has a higher degree of control than ACC or LKAS is operating, or a case in which automatic driving that automatically changes, merges, or branches lanes is being performed. A driving mode in which the degree of automatic driving is equal to or higher than a predetermined standard is an example of a "second driving mode".

The above "predetermined standard" can be set arbitrarily. It is assumed that the first driving mode is a manual driving and the second driving mode is an automatic driving. The present embodiment is applied to the driving assist control (an advanced rider assistance system) corresponding to the first driving mode and may be applied to the automatic driving control.

With reference to FIG. 2, the various devices 22 include an engine control device 45, a brake actuator 42, and a steering actuator 43.

The engine control device 45 includes a fuel injector 46, an ignition device 47, a throttle device 48, and the like. That is, the engine control device 45 includes an engine auxiliary device for driving the engine 10.

The brake actuator 42 supplies hydraulic pressure to the front and rear brakes 2B12B in accordance with an operation on the brake operator and operates them. The brake actuator 42 also serves as a control unit for an anti-lock brake system (ABS).

The steering actuator 43 outputs a steering torque to a steering mechanism from the bar handle 4 to the fork member 3b. The steering actuator 43 operates an electric motor, which is its own drive source, in accordance with detection information of the steering torque sensor 36 and applies an assist torque to the steering mechanism. The steering actuator 43 includes an ST-ECU that electrically controls the operation of the electric motor.

With reference to FIG. 5, the steering actuator 43 is disposed on the left side of the handle support unit 6*a* and mounted on the vehicle body frame 5. The steering actuator 43 is disposed so that a drive shaft 43*a* of the electric motor is parallel to the handle rotation shaft. A rocking arm 43*b* is integrally rotatably mounted in the drive shaft 43*a*. The rocking arm 43*b* is connected to an actuator connection unit 4*a*1 of the handle post 4*a* via a connection rod 43*c*. Thus, a driving force (a torque) of the electric motor can be transmitted to the handle post 4*a*, and thus, the steering of the front wheel 2 is assisted.

<Steering Assist Control>

With reference to FIG. 1, the vehicle acceleration sensor 34 is supported by the vehicle body (for example, the vehicle body frame 5) of the motorcycle 1. For example, the vehicle acceleration sensor 34 is disposed in the vicinity of a line segment L that connects a grounding point Gp of the rear wheel 12 and a substantially central portion of the head pipe 3*a* in a side view. The vehicle acceleration sensor 34 detects an angular rate Y in a yaw direction and an angular rate R in a roll direction of the motorcycle 1. Hereinafter, the angular rate Y in the yaw direction may be referred to as a yaw rate Y. The vehicle body of the embodiment includes not only the vehicle body frame 5 but also a constitution that performs behaviors such as rolling, pitching, and yawing integrally with the vehicle body frame 5.

When the motorcycle 1 has a low speed, the motorcycle 1 has a characteristic that a bank (roll) of the vehicle body is generated after the turning (yaw) is generated by the operation of the bar handle 4. That is, when the motorcycle 1 has a low speed, since the yaw is generated in advance, it is preferable to mainly detect the yaw angular rate Y. On the other hand, when the motorcycle 1 has a high speed, the motorcycle 1 has a characteristic that the turning (yaw) is generated after the bank (roll) of the vehicle body is generated. That is, when the motorcycle 1 has a high speed, since the roll is generated in advance, it is preferable to mainly detect the roll angular rate R. This characteristic is referred to as a turning characteristic of the motorcycle 1.

Figure 4:
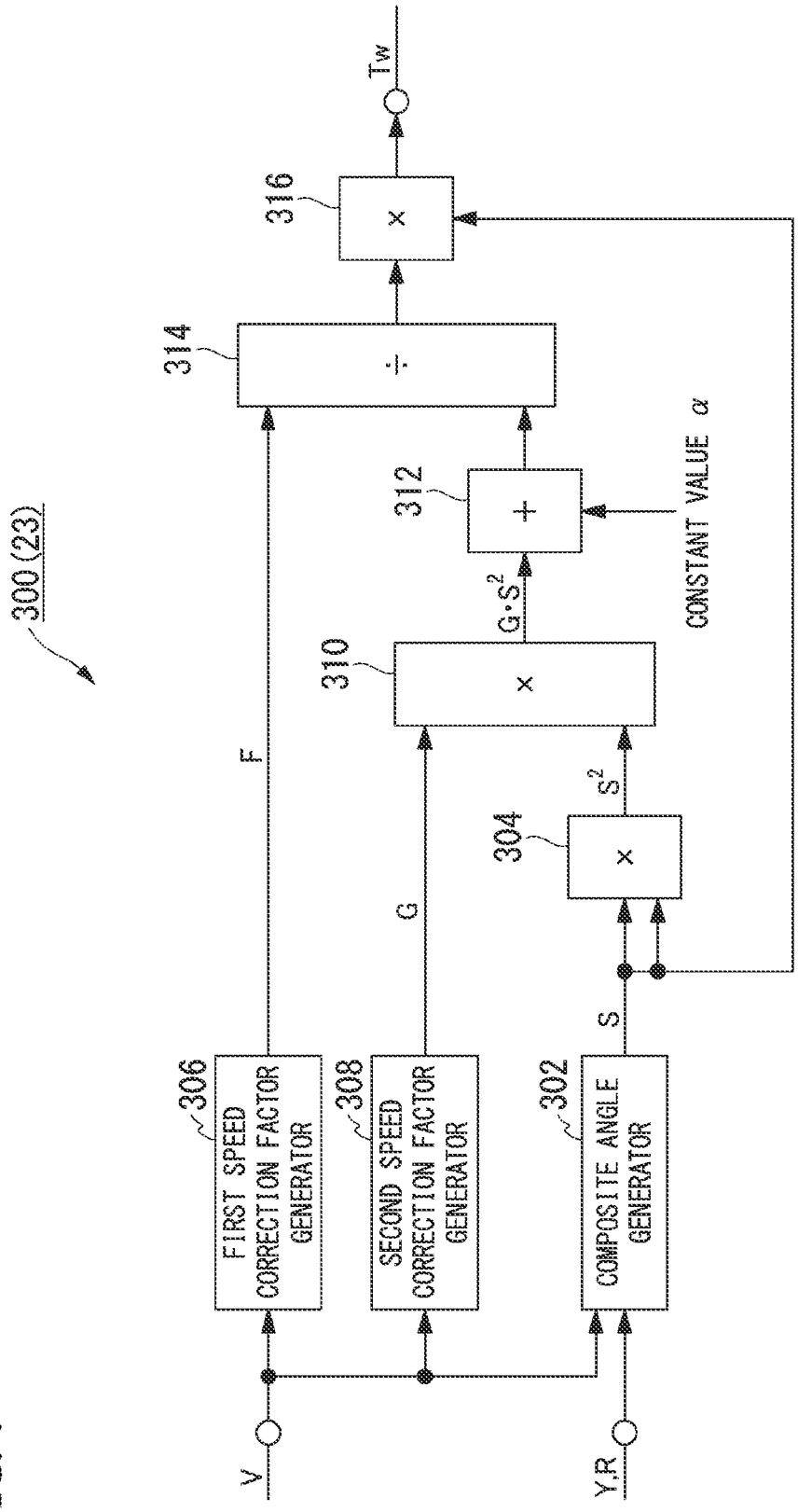
FIG. 4 is a constitution diagram of a staggering suppression assist torque calculation block of the steering assistance device.

With reference to FIG. 4, the control device 23 combines the yaw angular rate Y with the roll angular rate R detected by the vehicle acceleration sensor 34 to generate a composite angular rate S. The control device 23 combines the yaw angular rate Y and the roll angular rate R detected by the vehicle acceleration sensor 34 by changing weightings thereof as follows in accordance with the detected vehicle speed V. That is, from the turning characteristic of the motorcycle 1 described above, when the vehicle speed V is low, the combination is performed in a state in which the weighting of the yaw angular rate Y is made larger than that of the roll angular rate R, and when the vehicle speed V is high, the combination is performed in a state in which the weighting of the roll angular rate R is made larger than that of the yaw angular rate Y.

In generation of the composite angular rate S, for example, the composite angular rate S may be generated by adding a value (Y×AD1) obtained by multiplying the yaw angular rate Y by a first adjustment value AD1 to a value (R×AD2) obtained by multiplying the roll angular rate R by a second adjustment value AD2, as shown in the following Equation (1).

$$S = Y \times AD1 + R \times AD2 \tag{1}$$

In this case, the first adjustment value AD1 is set to be large on the low speed side and to be small on the high speed side. The second adjustment value AD2 is set to be small on the low speed side and to be large on the high speed side.

Figure 3:
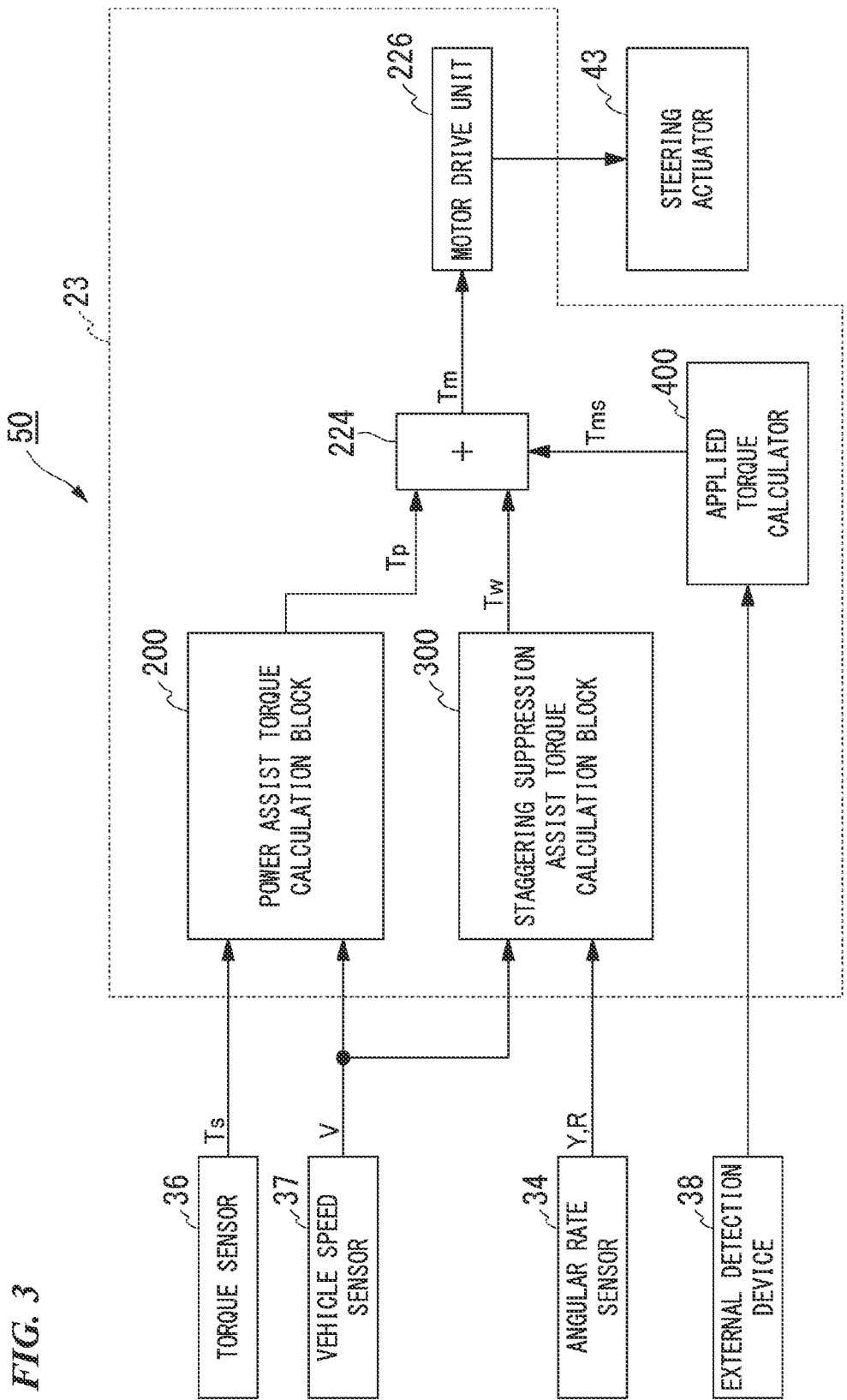
FIG. 3 is a constitution diagram of a steering assistance device for the motorcycle.

FIG. 3 is a constitution diagram of a steering assistance device 50.

The steering assistance device 50 includes the steering torque sensor 36, the vehicle speed sensor 37, the vehicle angular rate sensor 34, the external detection device 38, the control device 23, and the steering actuator 43.

The vehicle speed sensor 37 detects, for example, a rotation speed of an output shaft of the power unit U of the motorcycle 1 and detects a rotation speed of the rear wheel 12 and thus a vehicle speed of the motorcycle 1 from the rotation speed of the output shaft. The vehicle speed may be detected by obtaining wheel speed information from at least one of ABS and a traction control system (TCS).

The control device 23 includes a power assist torque calculation block 00, a staggering suppression assist torque calculation block 300, and an applied torque calculator 400. Each of the blocks 200 and 300 can operate independently, or can operate as a whole.

The power assist torque calculation block 200 calculates a power assist torque Tp applied to the bar handle 4 based on a vehicle speed V and a steering torque Ts. The vehicle speed V is calculated from the detection information of the vehicle speed sensor 37, that is, the rotation speed of the driving wheel (the rear wheel 12). The steering torque Ts corresponds to an input torque to the bar handle 4 by the driver and is calculated from the detection information of the steering torque sensor 36. The power assist torque Tp is a torque for reducing the steering of the bar handle 4 by the driver.

The staggering suppression assist torque calculation block 300 calculates a staggering suppression assist torque Tw applied to the bar handle 4 based on the vehicle speed V, the yaw angular rate Y, and the roll angular rate R. The yaw angular rate Y and the roll angular rate R are calculated from the detection information of the vehicle angular rate sensor 34. The staggering suppression assist torque Tw is a torque for suppressing the staggering of the motorcycle 1. For example, the staggering suppression assist torque Tw acts in a direction of turning the bar handle 4 and the front wheel 2 to the left when the motorcycle 1 is tilted to the left. The staggering suppression assist torque Tw acts in a direction of turning the bar handle 4 and the front wheel 2 to the right when the motorcycle 1 is tilted to the right.

The applied torque calculator 400 calculates an applied torque Tms, which will be described later, based on the detection information of the external detection device 38, and the like.

The control device 23 includes an adder 224 and a motor drive unit 226.

As shown in the following Equation (2), the adder 224 adds the power assist torque Tp to the staggering suppression assist torque Tw and generates an assist torque Tm. The adder 224 outputs the generated assist torque Tm to the motor drive unit 226.

$$Tm = Tp + Tw \tag{2}$$

The motor drive unit 226 converts the assist torque Tm into a torque current and supplies the converted torque current to the electric motor of the steering actuator 43. The electric motor is driven while the torque current is being supplied and generates a driving force according to the torque current. The driving force of the electric motor is transmitted to the handle post 4*a* via the connection rod 43*c* and the like and assists the rotation of the bar handle 4 and the front wheel 2. That is, a driving force (an auxiliary force)

in accordance with the assist torque Tm is applied to the bar handle 4 and the front wheel 2.

With reference to FIG. 4, the staggering suppression assist torque calculation block 300 includes a composite angular rate generator 302, a multiplier 304, a first vehicle speed correction factor generator 306, a second vehicle speed correction factor generator 308, a multiplier 310, an adder 312, a divider 314, and a multiplier 316.

The composite angular rate generator 302 combines the yaw angular rate Y with the roll angular rate R detected by the vehicle angular rate sensor 34 to generate a composite angular rate (a vehicle body behavior rate) S indicating a behavior of the motorcycle 1.

The multiplier 304 multiplies the composite angular rate S and the composite angular rate S to generate the square of the composite angular rate S.

The first vehicle speed correction factor generator 306 generates a first vehicle speed correction factor F that suppresses the staggering based on the vehicle speed V.

The second vehicle speed correction factor generator 308 generates a second vehicle speed correction factor G that suppresses the staggering based on the vehicle speed V.

The multiplier 310 multiplies the second vehicle speed correction factor G and the square of the composite angular rate S.

The adder 312 adds a value (G×S$^2$) output by the multiplier 310 to a constant value a.

The divider 314 divides the first vehicle speed correction factor F by a value (G×S$^2$+α) output by the adder 312.

The multiplier 316 multiplies a value (F/(G×S$^2$+α)) output by the divider 314 by the composite angular rate S. That is, the multiplier 316 outputs the staggering suppression assist torque Tw shown in the following Equation (3).

$$Tw = F \times S/(G \times S^2 + \alpha) \quad (3)$$

When the motorcycle 1 is staggering (when a tilt unintended by the driver occurs), the composite angular rate S becomes a relatively small value. When the motorcycle 1 is tilted due to a weight shift operation of the driver, the composite angular rate S becomes a relatively large value. For these cases, the following effects can be obtained by calculating the staggering suppression assist torque Tw with Equation (3). That is, when the composite angular rate S is large, the staggering suppression assist torque Tw can be reduced. Therefore, the staggering suppression assist torque Tw can be set not to interfere with the weight shift operation of the driver, and drivability can be improved.

As described above, the composite angular rate generator 302 combines (adds) the yaw angular rate Y with (to) the roll angular rate R on the low speed side by increasing the weighting of the yaw angular rate Y and reducing the weighting of the roll angular rate R. The composite angular rate generator 302 combines (adds) the yaw angular rate Y with (to) the roll angular rate R on the high speed side by reducing the weighting of the yaw angular rate Y and increasing the weighting of the roll angular rate R. Considering the turning characteristics of the motorcycle 1, it is preferable to mainly detect the yaw angular rate Y at a low speed and to mainly detect the roll angular rate R at a high speed in terms of detecting the behavior of the motorcycle 1 with high accuracy.

Then, when the behavior of the motorcycle 1 is large, the control device 23 determines that it is due to the weight shift operation of the driver and reduces the assist torque Tw. When the behavior of the motorcycle 1 is small, the control device 23 determines that it is due to the staggering of the vehicle body rather than the weight shift operation of the driver and increases the assist torque Tw.

In this way, regardless of whether the motorcycle 1 is at a low speed or at a high speed, staggering suppression assist can be performed without a sense of discomfort with respect to the operation of the driver.

Incidentally, when the above-described driving assist control is performed, the motorcycle 1 has a behavior unintended by the rider. Therefore, it is desirable to enhance an effect of stabilizing the vehicle body as compared with normal assist steering control when the driving assist control is not performed. That is, it is desirable to increase the assist torque Tm when the driving assist control is activated. In the present embodiment, when specified functions (including a warning) of the advanced rider assistance system (ARAS) of the motorcycle 1 are activated, the control shifts to control focusing on stability of the vehicle body behavior.

In the present embodiment, functions for applying the control focusing on the stability of the vehicle body behavior are, for example, the following three among various functions of the advanced rider assistance system of the motorcycle 1.

The first one is a collision mitigation brake system (CMBS), the second one is a lane departure warning (LDW), and the third one is blind spot information (BSI).

First, an example of the CMBS will be described.

Figure 7:
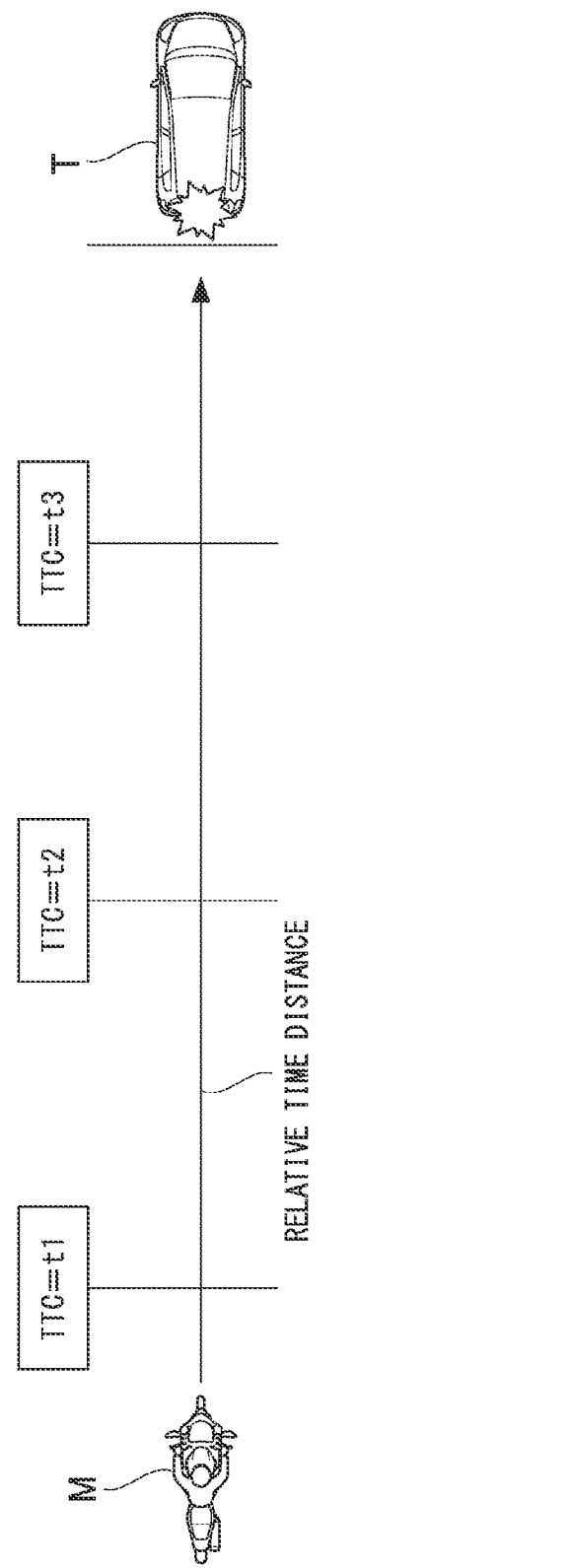
FIG. 7 is an explanatory diagram of a warning threshold value of a collision mitigation brake in the advanced rider assistance system.

With reference to FIGS. 6 and 7, in the CMBS of the embodiment, a three-stage warning threshold value TTC is set. For the warning threshold value TTC of the CMBS, a relative time distance (a distance traveling within a specified time at a current speed) with respect to an obstacle such as another vehicle T in front of an own vehicle M is used. A first warning threshold value t1 is a threshold value when a warning display (a first warning) using an indicator lamp, a liquid crystal panel, or the like is performed. The first warning is activated when the relative time distance from the obstacle becomes equal to or less than the threshold value t1.

A second warning threshold value t2 is a threshold value when a second warning (for example, a warning for a rider's tactile sensation such as vibrating a body contact portion in the vehicle body, and a warning that causes a vehicle body behavior such as weak braking) that is stronger than the first warning is issued. The second warning is activated when the relative time distance from the obstacle becomes the threshold value t2 or less that is shorter than the threshold value t1.

A third warning threshold value t3 is a threshold value when a third warning (for example, a warning with stronger vibration or the like, and a warning with stronger braking or the like) that is stronger than the second warning is issued. The third warning is activated when the relative time distance from the obstacle becomes the threshold value t3 or less which is shorter than the threshold value t2.

Each of the first to third warnings is set to be stronger as the relative time distance from the obstacle becomes shorter.

In the embodiment, when the relative time distance from the obstacle is equal to or less than the threshold value t3 (when a third warning flag is ON), the control shifts to high-stability control that prioritizes improvement of attitude control of the motorcycle 1. In the high-stability control, an assist steering control gain is corrected to a higher high-stability gain. Thus, a decrease of the assist torque Tm is suppressed, the assist torque Tm is maintained at a high value, and the attitude control of the motorcycle 1 is improved.

Next, an example of the LDW will be described.

Figure 8:
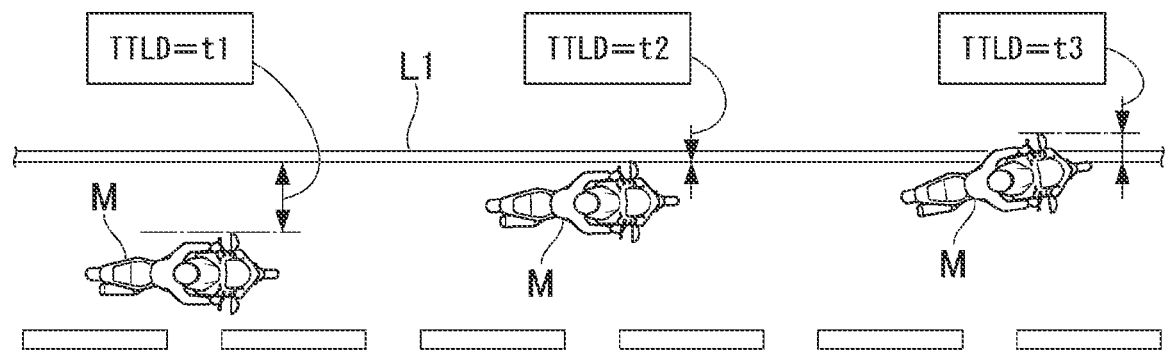
FIG. 8 is an explanatory diagram of a warning threshold value for a lane departure warning in the advanced rider assistance system.

With reference to FIGS. 6 and 8, in the LDW of the embodiment, a three-stage warning threshold value TTLD is set. For the warning threshold TTLD of the LDW, a distance from a lane marking line (a center line, a boundary line, an outer line, or the like) L1 of a vehicle lane (a travel lane) to the own vehicle is used. A first warning threshold value t1 is a threshold value when a warning display (a first warning) using an indicator lamp, a liquid crystal panel, or the like is performed. The first warning is activated when the distance from the lane marking line L1 becomes equal to or less than the threshold value t1.

A second warning threshold value t2 is a threshold value when a second warning (for example, a warning for the rider's tactile sensation such as vibrating a body contact portion in the vehicle body, and a warning that causes a vehicle body behavior such as weak braking) that is stronger than the first warning is issued. The second warning is activated when the distance from the lane marking line L1 becomes the threshold value t2 or less that is shorter than the threshold value t1. The threshold value t2 includes a case in which the distance is 0. That is, there may be a setting in which the second warning is issued immediately before the lane departure.

A third warning threshold value t3 is a threshold value when a third warning (for example, a warning with stronger vibration or the like, and a warning with stronger braking or the like) that is stronger than the second warning is issued. The third warning is activated when the distance from the lane marking line L1 becomes the threshold value t3 or less which is shorter than the threshold value t2. The threshold value t3 includes a case of a negative distance. That is, there may be a setting in which the third warning is issued when an amount of the lane departure becomes the threshold value t3 or more.

Each of the first to third warnings is set to be stronger as the distance from the lane marking line L1 becomes shorter or becomes larger on the minus side.

In the embodiment, when the distance from the lane marking line L1 is equal to or less than the threshold value t3 (when a third warning flag is ON), the assist steering control gain is adjusted to suppress further approach to the lane marking line L1 that prioritizes the improvement of the attitude control of the motorcycle 1. The control shifts to high-stability control. In the high-stability control, the assist steering control gain is corrected to a higher high-stability stable gain.

In such control, for example, as shown in FIG. 8, when the own vehicle M moves to the left and a distance from the lane marking line L1 (an outer line, or the like) becomes a threshold value t3 or less, in order to suppress further movement to the left side of the own vehicle M, a reverse handle operation to the right side which is a starting point of movement to the left side is restricted. Specifically, the assist steering control gain is adjusted so that the handle operation to the right side is heavier than the handle operation to the left side. For example, in this control, the assist steering control gain is corrected to a higher high-stability gain only for the reverse handle operation to the side opposite to the side on which the approach to the lane marking line L1 is recognized, and the control to reduce the assist torque Tm is maintained for the handle operation to the side on which the approach to the lane marking line L1 is recognized.

Thus, a decrease of the assist torque Tm is suppressed, the assist torque Tm is maintained at a high value, and the attitude control of the motorcycle 1 is improved.

Next, an example of the BSI will be described.

Figure 9:
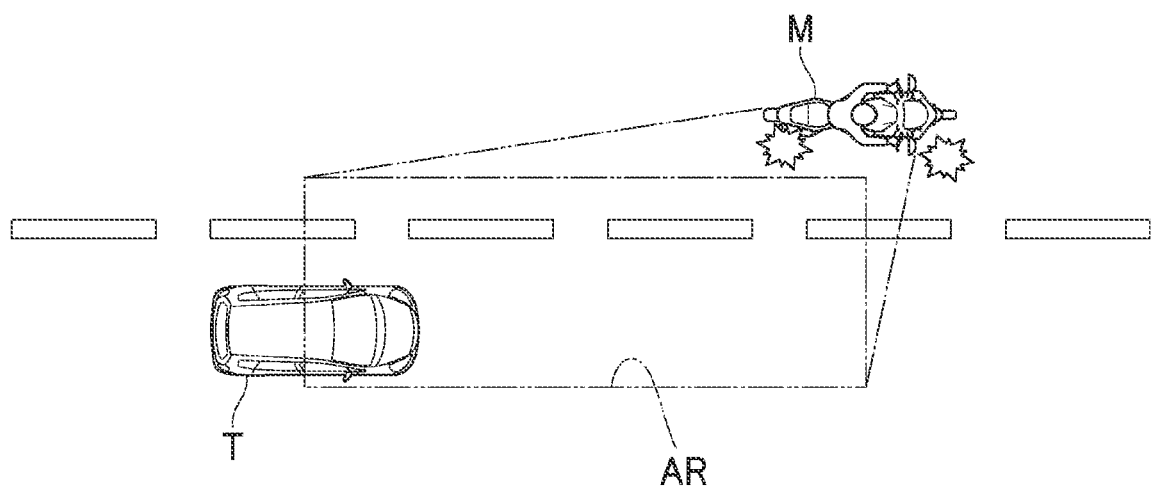
FIG. 9 is an explanatory diagram of a warning threshold value of blind spot information in the advanced rider assistance system.

With reference to FIGS. 6 and 9, in the BSI of the embodiment, a two-stage warning threshold value is set. A predetermined detection flag is used for the warning threshold value of the BSI.

The detection flag used for the warning threshold value of the BSI is, for example, the following two flags: a first flag and a second flag.

The first flag is a flag indicating that the presence of the other vehicle T is detected in a detection area AR on either the left or right side behind the own vehicle M. The second flag is a flag indicating that a course change prediction operation (an operation in which a course change is predicted) of the own vehicle M to the side on which the other vehicle T is detected is detected in a state in which the first flag is set.

The first flag indicates that the other vehicle T is actually detected by a camera, radar, or the like in the embodiment, but the present invention is not limited thereto. For example, the first flag may predict and detect the presence of the other vehicle T by the fact that either a left or right blinker of the other vehicle T located behind the own vehicle M in the same lane is on.

In the embodiment, the second flag indicates an operation of the blinker of the own vehicle M on the side on which the presence of the other vehicle T is recognized, but the present invention is not limited thereto. For example, the second flag may indicate that at least one of a seating position, a seating posture, an operation of reverse steering, and the like of the rider of the own vehicle M is detected as the course change prediction operation.

When the first flag is set (when the presence of the other vehicle T is detected in the detection area), the first warning is issued. The first warning is a warning display using, for example, an indicator lamp, a liquid crystal panel, or the like.

When the second flag is set (when the course change prediction operation is detected), the second warning (for example, a warning for the rider's tactile sensation such as vibrating the body contact portion in the vehicle body, and a warning that causes a vehicle body behavior such as braking stronger than specified one) that is stronger than the first warning is issued, and the assist steering control gain is adjusted so that the roll (and thus the lane change) to the side on which the presence of the other vehicle T is recognized can be suppressed.

Specifically, the assist steering control gain is adjusted so that the reverse steering operation to the side opposite to the side on which the presence of the other vehicle T is recognized becomes heavier than the steering operation to the side on which the presence of the other vehicle T is recognized. For example, in this control, the assist steering control gain is corrected to the higher high-stability gain only for the reverse steering operation to the side opposite to the side on which the presence of the other vehicle T is recognized, and the control that reduces the assist torque Tm is maintained for the steering operation to the side on which the presence of the other vehicle T is recognized.

The following Equation 1 is an equation for calculating the applied torque Tms for variable maneuverability when a flag for an operation of the ARAS or an operation warning is set. In Equation, a indicates a front wheel inertia correction coefficient, and the front wheel presession effect (a gyro moment effect) is amplified by (a+FlagARAS×GainARAS). In Equation, $I_{wheel}$ indicates a front wheel rotation inertia, ωwheel indicates a front wheel rotation angular rate, and Ω indicates a vehicle body roll rate.

$$T_{ms} = (a + \text{Flag}_{ARAS} \times \text{Gain}_{ARAS}) \cdot I_{wheel} \cdot \omega_{Wheel} \times \Omega \qquad \text{[Math. 1]}$$

Figure 10:
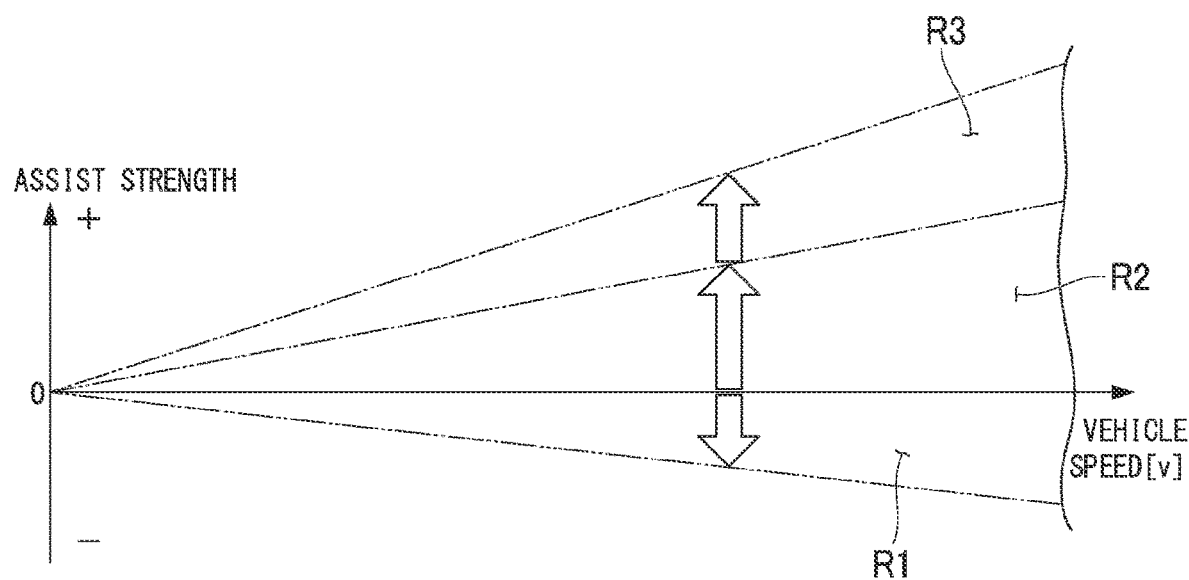
FIG. 10 is a graph showing a relationship between assist strength of the steering assistance device and a vehicle speed.

The strength of the steering assist of the embodiment will be described with reference to a graph of FIG. 10. In the graph of FIG. 10, a vertical axis shows the assist strength with respect to the roll rate, and a horizontal axis shows the vehicle speed.

The maneuverability of the uncontrolled motorcycle 1 is along the horizontal axis of the graph. On the other hand, in control (a region R1 in the drawing) that weakens a turning characteristic of a handle, the assist strength is increased to the minus side between a medium speed range and a high speed range. Thus, it contributes to light maneuverability by reducing the entire assist torque Tm.

In control (a region R2 in the drawing) that strengthens the turning characteristic of the handle, the assist strength is increased to the plus side between the medium speed range and the high speed range. Thus, it contributes to heavy maneuverability by increasing the entire assist torque Tm. At this time, the maneuverability is obtained as if the gyro moment of the front wheel 2 was increased.

In addition to these controls, in control (a region R3 in the drawing) that further increases the assist strength to the plus side, the applied torque Tms of Equation 1 is further added to the region R2 between the medium speed range and the high speed range. Thus, the entire assist torque Tm is further increased, which contributes to an increase in straightness (the high-stability control).

In particular, when the presence of another vehicle T is detected in any of the left and right detection areas behind the own vehicle M, control that suppresses a lane change (a course change) of the own vehicle M to the same side is performed. That is, control that suppresses (makes heavy) the handle operation (the reverse handle operation that is a starting point of a lane change operation) to the side opposite to the side on which the other vehicle T is detected. At this time, the effect of suppressing the lane change to the other vehicle T side is further enhanced by making it easier (lighter) to operate the handle operation to the side on which the presence of the other vehicle T is recognized. When the presence of the other vehicle T is no longer detected, the reverse handle suppression control is promptly reset, and the normal assist steering control is returned to continue the driving support.

In this way, at the time of the ARAS operation, it is possible to shift to the control that prioritizes the improvement of the attitude control of the motorcycle 1 using a threshold value of the ARAS operation as a trigger. In particular, at the time of the ARAS operation, when the presence of the other vehicle T is detected in either the left or right detection area behind the own vehicle M, the reverse handle operation is suppressed in order to suppress the lane change of the own vehicle M to the same side. Thus, the effect of the BSI can be enhanced.

As described above, the steering assistance device 50 in the above embodiment is a steering assistance device 50 for a saddle type vehicle (for example, the motorcycle 1) that rocks the vehicle body (for example, the vehicle body frame 5) in the roll direction to generate a steering angle on the steering wheel (for example, the front wheel 2). The steering assistance device 50 includes the steering actuator 43 that applies the assist torque Tm in the steering direction to the front wheel suspension device 3 that supports the front wheel 2, the control device 23 that drives and controls the steering actuator 43, and the external detection device 38 that detects the situation around the vehicle.

When the driving support control is performed, the control device 23 shifts to control that focuses on the stability of the vehicle body behavior. The control device 23 changes the control gain based on the warning of the ARAS (the CMBS, the LDW, the BSI, or the like), the operation determination threshold value information, or the information indicating that the operation is in progress. Thus, it is possible to perform the assist steering control to a more appropriate degree in accordance with each situation at the time of the operation of the ARAS, and it is possible to improve the attitude control of the vehicle.

Then, in the steering assistance device 50, when the external detection device 38 detects an obstacle (the other vehicle T) on either the left or right side of the own vehicle M, the control device 23 controls the assist torque (Tm) so that the handle operation to the side opposite to the side on which the obstacle is detected becomes heavier (difficult to turn) than a case in which the obstacle is not detected. The control device 23 maintains the steering assist and makes the handle relatively lighter (easier to turn) when the handle operation is performed to the side on which the obstacle is detected.

With such a constitution, while the advanced rider assistance system detects the obstacle on the left and right sides of the own vehicle M, the handle operation to the side opposite to the side on which the obstacle is detected is made heavy based on the obstacle detection information. In the saddle type vehicle that rolls the vehicle body to generate a steering angle, the handle operation to the side opposite to the side on which the obstacle is detected is the reverse handle operation which is a starting point of changing the course to the side on which the obstacle is detected. The change of course to the side on which the obstacle is detected can be suppressed by suppressing the reverse handle operation. In this way, it is possible to perform the appropriate assist steering control according to a situation around the vehicle, and it is possible to enhance the effect of the advanced rider assistance system.

In the steering assistance device 50, when an obstacle on either the left or right side of the own vehicle M is detected, and a course change prediction operation of the own vehicle M toward the side on which the obstacle is detected is detected, the control device 23 controls the assist torque Tm so that the handle operation to the side opposite to the side on which the obstacle is detected becomes heavy.

With such a constitution, it is possible to generate the assist torque as usual until the course change prediction operation of the own vehicle M to the side on which the obstacle is detected is detected. As a result, it is possible to perform the assist steering control with less discomfort to the driver.

In the steering assistance device 50, when the control device 23 detects that the other vehicle T located behind the own vehicle M in the same lane as the own vehicle M is emitting either the left or right blinker, the control device 23 predicts and detects the presence of an obstacle on the side on which the blinker is on.

With such a constitution, the appropriate assist steering control can be performed not only when the presence of the other vehicle T is actually detected on either the left or right behind the own vehicle M, but also when the presence of the other vehicle T is predicted.

The present invention is not limited to the above embodiment. In the above-described embodiment, for example, a vehicle provided with a link type front wheel suspension device 3 is exemplified, but the present invention is not limited thereto. For example, the vehicle may be equipped with a well-known telescopic front fork in the front wheel suspension system.

The motorcycle is not limited to a vehicle in which the driver straddles the vehicle body, and also includes a scooter-type vehicle having a step floor and a motorized bicycle. The present invention is not limited to the motorcycle and can also be applied to a saddle type vehicle in which the front wheel and the front wheel suspension device are tilted and turned together with the vehicle body frame 5.

The saddle type vehicle includes all vehicles in which the driver straddles the vehicle body and rolls the vehicle body to achieve balance. The saddle type vehicle includes not only the motorcycles, but also three-wheeled vehicles (including front two-wheeled and rear one-wheeled vehicles in addition to front one-wheeled and rear two-wheeled vehicles) or four-wheeled vehicles. It also includes scooter-type vehicles with step floors and motorized bicycles. Vehicles that include electric motors as their prime movers are also included.

The constitution in the above embodiment is an example of the present invention, and various changes can be made without departing from the gist of the present invention, such as replacing the constituent elements of the embodiment with well-known constituent elements.

REFERENCE SIGNS LIST

1 Motorcycle (saddle type vehicle)
2 Front wheel (steering wheel)
3 Front wheel suspension device (suspension device)
23 Control device (control means)
38 External detection device
43 Steering actuator
50 Steering assistance device
Tm Assist torque

The invention claimed is:

1. A steering assistance device for a saddle type vehicle that rocks a vehicle body in a roll direction and generates a steering angle on a steering wheel, comprising:
   a steering actuator configured to apply an assist torque to a suspension device that supports the steering wheel;
   a control device configured to drive and control the steering actuator; and
   an external detection device that includes at least some or all of a camera, a radar or a finder detects an obstacle, and recognize a position of the obstacle,
   wherein, when the external detection device detects the position of the obstacle on either a left or right side of an own vehicle, being the saddle type vehicle, and also detects a course change prediction operation of the own vehicle to a second side on which the obstacle is detected,
   wherein the control device controls the assist torque so that a handle operation to a first side opposite to the second side on which the obstacle is detected becomes heavy,
   wherein a first warning is issued when the external detection device detects the obstacle on either the left or right side of the own vehicle,
   wherein a second warning, that is stronger than the first warning, is issued when the external detection device detects the obstacle on either the left or right side of the own vehicle and also detects the course change prediction operation of the own vehicle to the second side on which the obstacle is detected, and
   wherein the course change prediction operation comprises a reverse handle operation to the first side opposite to the second side on which the obstacle is detected, which is a starting point of changing the course to the second side on which the obstacle is detected as the way to detect a force of the own vehicle or driver of the own vehicle towards the second side on which the obstacle is detected.

2. The steering assistance device for the saddle type vehicle according to claim 1, wherein, when the control device detects that another vehicle located behind the own vehicle, and in the same lane as the own vehicle, has actuated either a left or right blinker, the control device predicts and detects presence of the obstacle on a side, of the left side or the right side of the own vehicle, corresponding to a side of the other vehicle at which the left or right blinker has actuated.

\* \* \* \* \*